(12) United States Patent
Marus et al.

(10) Patent No.: US 11,970,401 B2
(45) Date of Patent: Apr. 30, 2024

(54) AMORPHIZATION OF SILICON

(71) Applicant: Advano, Inc., New Orleans, LA (US)

(72) Inventors: Gregory Alan Marus, New Orleans, LA (US); Jonathan Goodman, Evanston, IL (US); Meysam Shahami, New Orleans, LA (US)

(73) Assignee: Advano, Inc., New Orleans, LA (US)

( * ) Notice: Subject to any disclaimer, the term of this patent is extended or adjusted under 35 U.S.C. 154(b) by 861 days.

(21) Appl. No.: 16/943,368

(22) Filed: Jul. 30, 2020

(65) Prior Publication Data

US 2021/0347643 A1 Nov. 11, 2021

Related U.S. Application Data

(60) Provisional application No. 63/022,753, filed on May 11, 2020.

(51) Int. Cl.
| | |
|---|---|
| *C01B 33/02* | (2006.01) |
| *H01B 1/04* | (2006.01) |
| *H01M 4/30* | (2006.01) |
| *H01M 4/38* | (2006.01) |
| *H01M 10/0525* | (2010.01) |
| *H01M 4/02* | (2006.01) |

(52) U.S. Cl.
CPC ............. *C01B 33/02* (2013.01); *H01B 1/04* (2013.01); *H01M 4/386* (2013.01); *H01M 10/0525* (2013.01); *C01P 2002/02* (2013.01); *C01P 2002/60* (2013.01); *C01P 2002/72* (2013.01); *C01P 2002/82* (2013.01); *C01P 2004/62* (2013.01); *C01P 2004/64* (2013.01); *C01P 2006/40* (2013.01); *H01M 2004/021* (2013.01); *H01M 2004/027* (2013.01)

(58) Field of Classification Search
CPC ........... H01B 1/04; H01M 4/386; C01B 33/02
See application file for complete search history.

(56) References Cited

U.S. PATENT DOCUMENTS

| | | |
|---|---|---|
| 9,761,877 B2 | 9/2017 | Rosso et al. |
| 10,050,259 B2 * | 8/2018 | Shim .................. H01M 10/0525 |
| 10,707,484 B2 | 7/2020 | Wang et al. |
| 11,591,478 B2 * | 2/2023 | Ionescu ............... B02C 17/1815 |

(Continued)

OTHER PUBLICATIONS

Haleakala Solar & Roofing "Amorphous Silicon Vs Crystalline Silicon" https://haleakalasolar.com/amorphous-silicon-vs-crystalline-silicon/ 2022 (4 pages).*

(Continued)

*Primary Examiner* — Mark Kopec
(74) *Attorney, Agent, or Firm* — Young Basile Hanlon & MacFarlane, P.C.

(57) ABSTRACT

The formation of amorphous silicon for use in, for example, lithium-ion batteries is disclosed. The process can include milling a plurality of silicon nanocrystals having an average particle diameter and a percent crystallinity greater than about 60%, in a unit designed to reduce the average particle diameter to the same or a larger size, thereby forming a plurality of amorphous silicon nanoparticles having about the same average particle diameter as the silicon nanocrystals and a percent crystallinity of less than about 50%.

19 Claims, 4 Drawing Sheets

(56) References Cited

U.S. PATENT DOCUMENTS

2014/0225030 A1* 8/2014 Dehtiar ................ C01B 33/027
                                                              252/182.1
2021/0371288 A1* 12/2021 Okada ...................... C21D 9/52
2022/0380606 A1* 12/2022 Ionescu ................... C08K 3/04

OTHER PUBLICATIONS

Shen et al "The structure and property characteristics of amorphous/nanocrystalline silicon produced by ball milling", Journal of Materials Research vol. 10, pp. 139-148 (1995).*

Hou et al "The synergistic effects of combining the high energy mechanical milling and wet milling on Si negative electrode materials for lithium ion battery", Journal of Power Sources 349 (2017) 111e-20.*

* cited by examiner

AMORPHIZATION OF SILICON

CROSS-REFERENCE TO RELATED APPLICATIONS

This disclosure claims the benefit of priority to U.S. Patent Application No. 63/022,753, filed 11 May 2020, the entirety of which are incorporated herein.

FIELD OF THE INVENTION

The present disclosure is directed to the processing of silicon nanocrystals into amorphous silicon nanoparticles.

BACKGROUND

Lithium-ion (Li$^+$) secondary or rechargeable batteries are now the most widely used secondary battery systems for portable electronic devices. However, the growth in power and energy densities for lithium ion battery technology has stagnated in recent years as materials that exhibit both high capacities and safe, stable cycling have been slow to be developed. Much of the current research effort for the next generation of higher energy capacity materials has revolved around using small or nanoparticulate active material bound together with conductive agents and carbonaceous binders.

There is a current and growing need for higher power and energy density battery systems. The power requirements for small scale devices such as microelectromechanical systems (MEMS), small dimensional sensor systems, and integrated on-chip microelectronics exceed the power densities of current Li$^+$ based energy storage systems. Power densities of at least 1 J/mm$^2$ are desired for effective function for such systems, and current energy densities for Li$^+$ thin film battery systems are about 0.02 J/mm$^2$. Three dimensional architectures for battery design can improve the areal power density of Li$^+$ secondary batteries by packing more active material per unit area without employing thicker films that are subject to excessive cycling fatigue. Three-dimensional Lithium-ion battery architectures also increase lithium ion diffusion by maximizing the surface area to volume ratio and by reducing diffusion lengths.

The current state-of-the-art for anode electrodes in lithium ion batteries includes the use of high surface area carbon materials. However, the capacity of any graphitic carbon, carbon black, or other carbonaceous material is limited to a theoretical maximum of 372 mAh/g and about 300 mAh/g in practice because carbon electrodes are usually formed of carbon particles mixed with a polymeric binder pressed together to form a bulk electrode. To store charge, Li$^+$ intercalates between the planes of sp$^2$ carbon atoms and this C—Li$^+$—C moiety is reduced. In addition, the maximum number of Li$^+$ that can be stored is one per every six carbon atoms (LiC$_6$). While the capacity of graphitic carbon is not terribly high, the intercalation process preserves the crystal structure of the graphitic carbon, and so cycle life can be very good.

A more recent and promising option for anode materials is silicon (Si). In contrast to the intercalative charge storage observed in graphite, Si forms an alloy with lithium. Silicon-based negative electrodes are attractive because their high theoretical specific capacity of about 4200 mAh/g, which far exceeds than that of carbon, and is second only to pure Li metal. This high capacity comes from the conversion of the Si electrode to a lithium silicide which at its maximum capacity has a formula of Li$_{22}$Si$_6$, storing over 25 times more Li per atom than carbon. The large influx of atoms upon alloying, however, causes volumetric expansion of the Si electrode of over 400%. This expansion causes strain in the electrode, and this strain is released by formation of fractures and eventual electrode failure. Repeated cycling between Li$_x$Si$_y$ and Si thus causes crumbling of the electrode and loss of interconnectivity of the material. For example, 1 μm thick Si film anodes have displayed short cyclability windows, with a precipitously capacity drop after only 20 cycles.

Commonly, silicon nanocrystals are used for lithium-ion batteries and are prepared by gas phase synthesis (e.g., CVD), conventional solution-based nanocrystal growth (e.g., utilizing surface passivation agents and an Oswald ripening mechanism), jet milling, or mechanical comminution. Of these methods, mechanical comminution is the most industrially scalable. While these silicon nanocrystals can be incorporated into an anode, the resulting anodes suffer from lithium consumption during formation cycles and capacity loss during extended cycling. Accordingly, new silicon nanoscale structures are necessary for further improvements in lithium-ion batteries.

SUMMARY

A first embodiment is a process that includes providing a plurality of silicon nanocrystals having an average particle diameter and a percent crystallinity greater than about 60% to an amorphization unit adapted to triturate solids to about the average particle diameter; thereafter processing the plurality of silicon nanocrystals with the amorphization unit thereby forming a plurality of amorphous silicon nanoparticles having about the same average particle diameter as the silicon nanocrystals and a percent crystallinity of less than about 50%.

A second embodiment is a process that includes providing an admixture of a silicon feed and a fluid; processing the admixture, in a comminution mill, to form a milled admixture that includes a plurality of silicon nanocrystals in the fluid and thereafter continuing to process, in the trituration mill, to form an amorphous admixture that includes a plurality of amorphous silicon nanoparticles in the fluid; wherein the silicon feed has a percent crystallinity greater than about 70%, the silicon nanocrystals have a percent crystallinity greater than about 70%, and the amorphous silicon nanoparticles have a percent crystallinity less than about 50%; and wherein the silicon nanocrystals and the amorphous silicon nanoparticles, each has an average particle diameter that is about 50 nm to about 800 nm.

A third embodiment is a process that includes providing an admixture of a silicon feed and a first fluid; processing the admixture, in a comminution mill, to form a milled admixture that includes a plurality of silicon nanocrystals in the first fluid; thereafter amorphizing the silicon nanocrystals to form an amorphized admixture that includes a plurality of amorphous silicon nanoparticles in a second fluid.

BRIEF DESCRIPTION OF THE FIGURES

For a more complete understanding of the disclosure, reference should be made to the following detailed description and accompanying drawing figures wherein.

Figure 1:
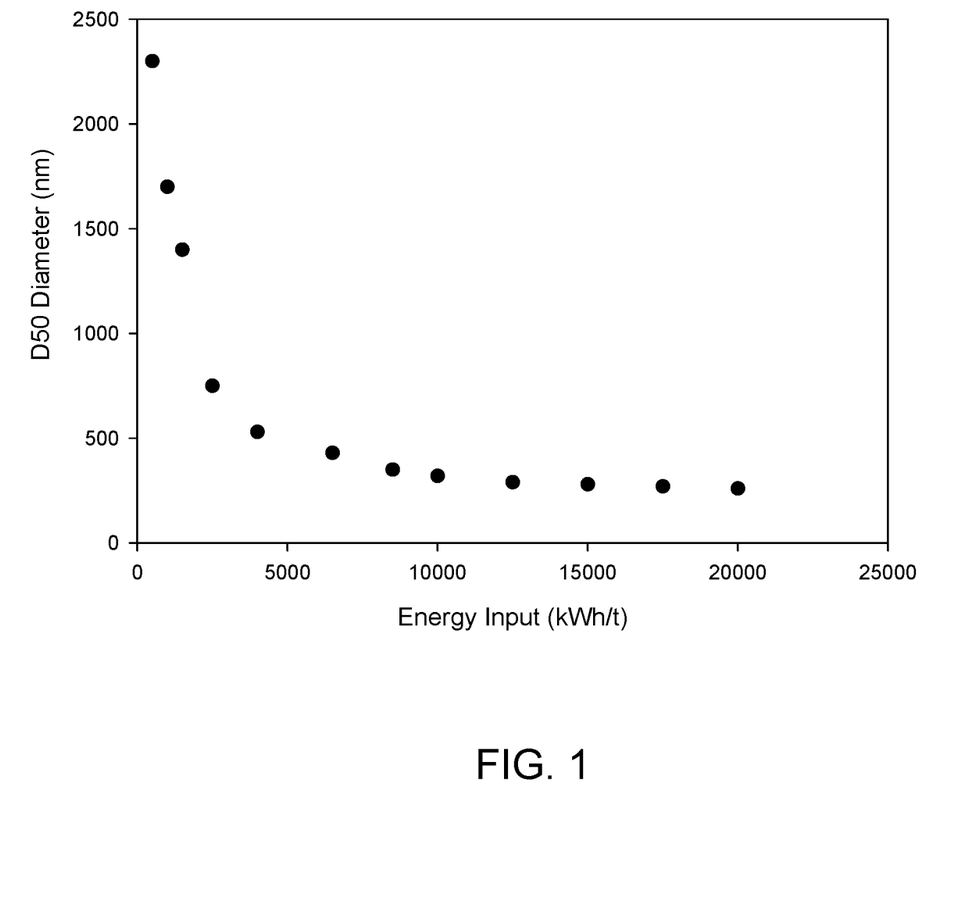
FIG. 1 is a plot of average particle diameter versus milling energy input showing two distinct processes, a size reduction process from 0 to about 4500 kWh/t and an amorphization process from about 6500 to 20,000 kWh/t.
Figure 2:
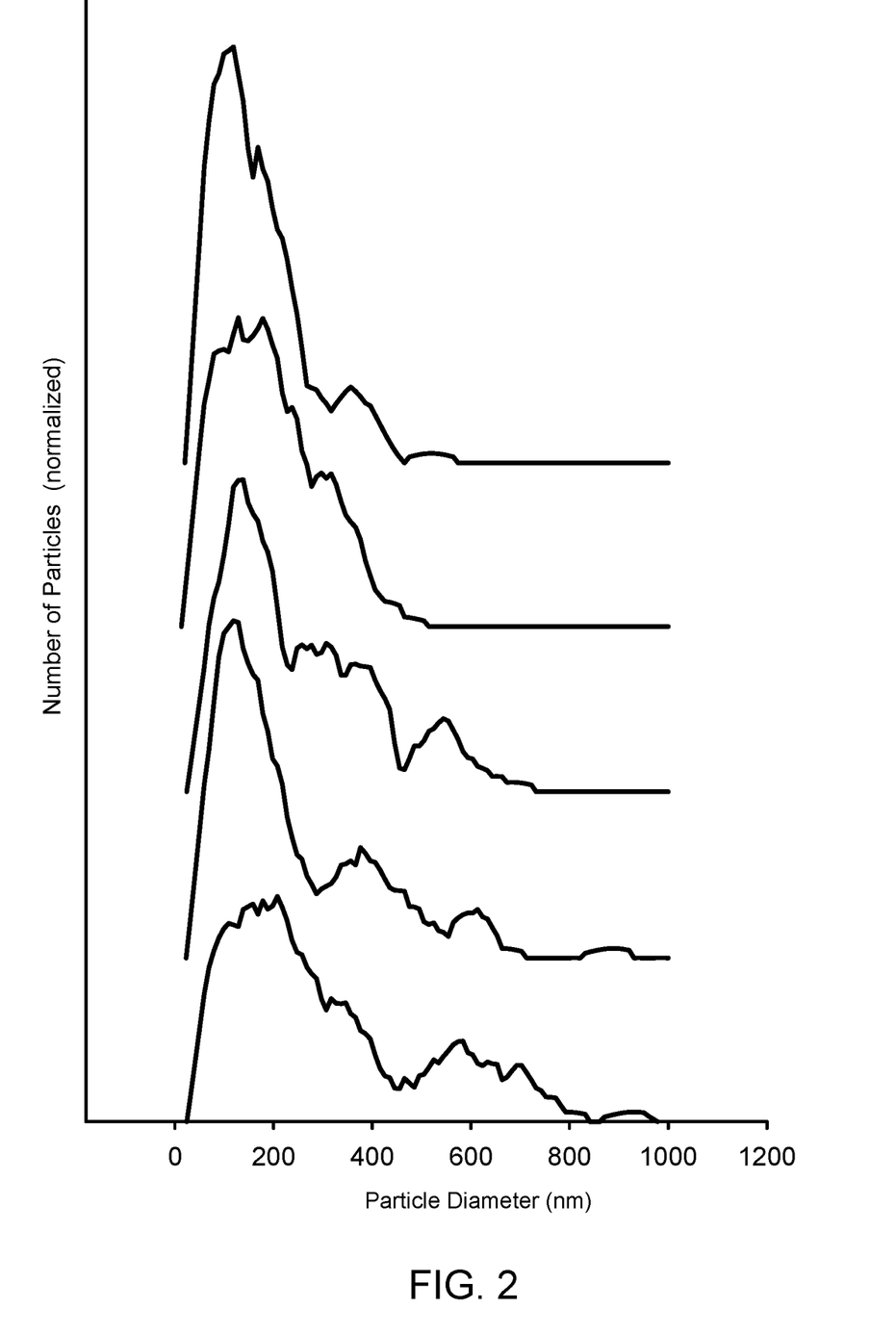
FIG. 2 is stacked plots of particle size distributions at increasing milling energy input showing the coalescence of the material to an average particle size, not the continued decrease in particle size with increasing energy input.
Figure 3:
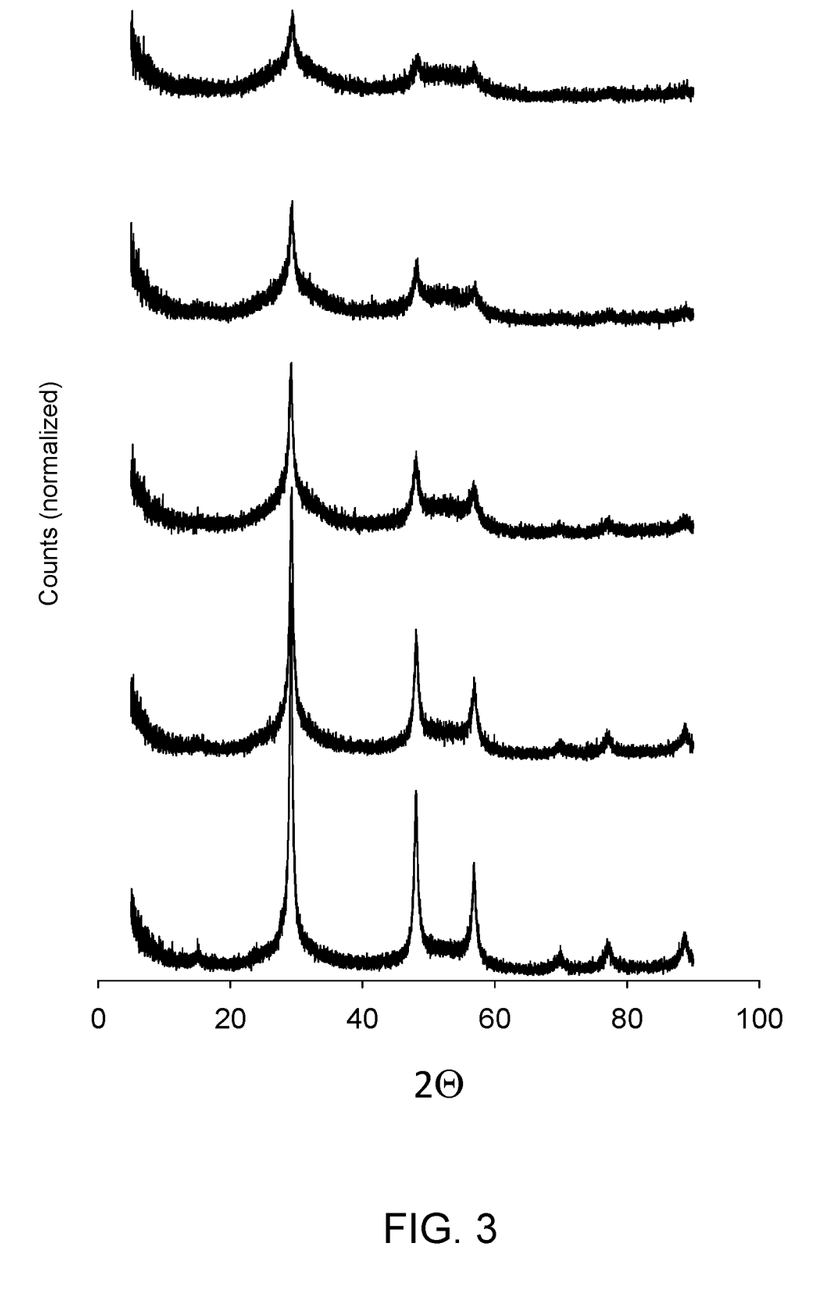
FIG. 3 is stacked plots of power X-ray diffraction patters for materials at different milling energy inputs, showing the line broadening and amorphization of the silicon.
Figure 4:
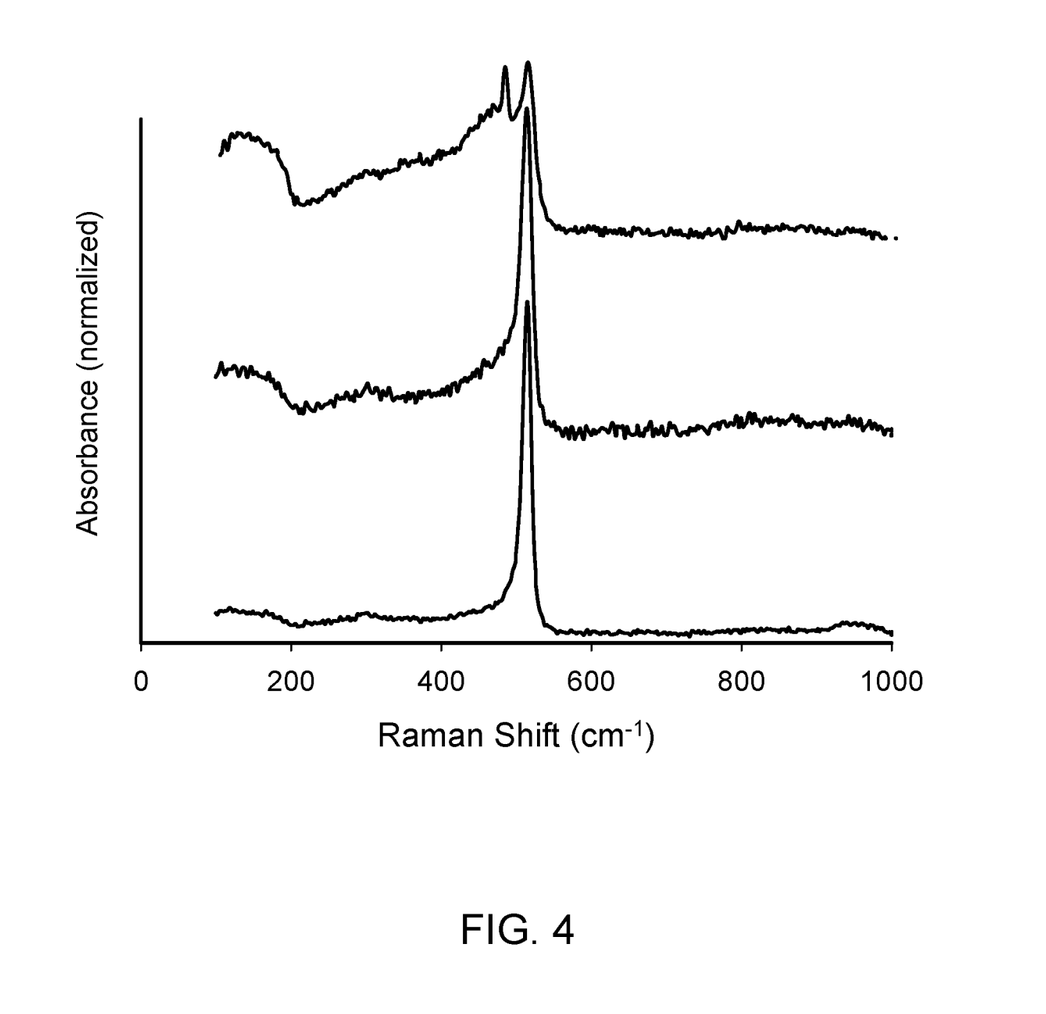
FIG. 4 is stacked plots of Raman spectra for materials at different milling energy inputs, showing the increase of absorption from 200 to about 500 $cm^{-1}$ corresponding to amorphous Si with the absorption for crystalline silicon appearing at 510 $cm^{-1}$.

While specific embodiments are illustrated in the figures, with the understanding that the disclosure is intended to be illustrative, these embodiments are not intended to limit the invention described and illustrated herein.

DETAILED DESCRIPTION

Objects, features, and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

Herein, the use of the word "a" or "an" when used in conjunction with the term "comprising" in the claims and/or the specification may mean "one," but it is also consistent with the meaning of "one or more," "at least one," and "one or more than one." The term "about" means, in general, the stated value plus or minus 5%. The use of the term "or" in the claims is used to mean "and/or" unless explicitly indicated to refer to alternatives only or the alternative are mutually exclusive, although the disclosure supports a definition that refers to only alternatives and "and/or."

As lithium ion battery manufacturers scramble for silicon to include in anode formulations, companies around the world have turned to milling technologies to triturate or comminute silicon feeds to sizes compatible with anode manufacturing. Notably, these manufacturers for the purpose of reduction of cost, energy, time, and machine wear, limit the milling time/extent to the minimum necessary to achieve the necessary particle size. Herewith, the inventors have discovered an improvement to the initial cycling of lithium ion cells that requires the extensive amorphization of the industrialized silicon nanocrystals (e.g., those made and supplied to lithium ion battery manufacturers). Importantly, these amorphous silicon nanoparticles can be accomplished using the machines and processes already in place for the formation of the industrialized silicon nanocrystals. Accordingly, a first embodiment is a method that includes processing, e.g., in a comminution mill, a plurality of silicon nanocrystals to a plurality of amorphous silicon nanocrystals. Whereas comminution mills are often used to reduce an average particle diameter of a particle or crystal, herein the method utilizes the comminution mill to affect the crystallinity of the particulates without affecting the average particle diameter. In one instance, this process can include providing a plurality of silicon nanocrystals; these silicon nanocrystals, preferably, have an average particle diameter, for example, in the range of about 50 nm to 800 nm, about 150 nm to about 500 nm, about 150 nm to about 400 nm, about 150 nm to about 300 nm, or about 200 nm to about 300 nm, and a percent crystallinity greater than about 60%, about 70%, about 80%, about 90%, or about 95%. The silicon nanocrystals are provided to an amorphization unit adapted to triturate solids to about the average particle diameter and thereafter, the plurality of silicon nanocrystals is processed with the amorphization unit to form a plurality of amorphous silicon nanoparticles. Importantly, the amorphous silicon nanoparticles have about the same average particle diameter as the silicon nanocrystals while having a percent crystallinity of less than about 50%, about 40%, about 30%, about 20%, or about 10%. Notably, the amorphous silicon nanoparticles have about the same average particle diameter as the silicon nanocrystals when the change in the average particle diameters are less than about 10%, 9%, 8%, 7%, 6%, 5%, 4%, 3%, 2%, or 1%. For example, if the average particle diameter of the silicon nanocrystal is about 250 nm and there was a 10% change in the average particle diameter, the amorphous silicon nanoparticle would have an average particle diameter of about 225 nm. Most often, the particle size of the amorphous silicon nanoparticle is smaller than the particle size of the silicon nanocrystals but this is not always the case. In certain methods, for example wherein the process has been adapted to cold-welding, the average particle size of the amorphous silicon nanoparticles may be greater than the average particle size of the silicon nanocrystals.

Notably, the process/method utilizes an amorphization unit. Herein, the amorphization unit can be a comminution mill, a trituration mill, or another mill generally designed and adapted to reduce the size of a feed material by impact, grinding, shear, or other mechanical processes. Notably, said units commonly have a lower limit for the comminuted product; for example, bead mills are adapted to produce materials with a lower size limit that is often defined by the size of the beads utilized in the mill and the size of screens that permit the flow of material through the system. Commonly, it is understood that when this lower limit is reached materials pass through the mill without being affected by the milling media, accordingly, manufacturers and operators design processes that reach the desired size as fast as possible and do not waste energy on milling materials that will not be affected by system.

Further and as used herein, the terms triturate and comminute have the same meaning. Both terms refer to the process of reducing the size of a material by providing physical force to the material. Herewith the terms are use interchangeable unless a specific modification are provided with the term.

Herewith, amorphous silicon nanoparticles do not have the long range ordering of a crystalline lattice. For silicon, the amorphous vs. crystalline content can be observed in the Raman spectrum. The strong band at 521 $cm^{-1}$ of a crystalline sample is clearly distinguishable from a broad band centered at 480 $cm^{-1}$ that is exhibited by the amorphous silicon. These very distinct spectra make it possible to use a simple Beer's law calculation based on the ratio of the peak heights at 521 $cm^{-1}$ and 480 $cm^{-1}$ to estimate the relative amounts of the two forms. The amorphous silicon nanoparticles can include an atom ratio of the silicon in amorphous silicon domains to silicon in crystalline silicon domains, where the a-Si:c-Si ratio is in the range of about 1:1 to about 1000:1. In other instances, the ratio can be in the range of about 1:1 to about 100:1, about 1:1 to about 50:1, about 1:1 to about 25:1, about 1:1 to about 20:1, about 1:1 to about 15:1, about 1:1 to about 10:1, about 2:1 to about 100:1, about 2:1 to about 50:1, about 2:1 to about 25:1, about 2:1 to about 20:1, about 2:1 to about 15:1, or about 2:1 to about 10:1. Preferably, greater than about 50 atom %, about 60 atom %, about 70 atom %, about 80 atom %, about 90 atom %, or about 95 atom % of the silicon is in an amorphous silicon domain. In another preferable instance, the amorphous silicon nanoparticles consist essentially of, or consist of, amorphous silicon domains. In another instance, the absence of a crystalline species can be observed in the X-ray diffraction (XRD) of the particulate. As XRD is not typically a quantitative technique, the XRD pattern of the particulate may display reflections that correspond to crystalline silicon but, qualitatively, one of ordinary skill can appreciate the lack of crystallinity in the particulate. That is, even in instances wherein the atom percentage of silicon in amorphous domains is in excess of 95%, the Si(111) reflection may be observable. Preferably, the Si(111) reflection (at about 28.5° 2Θ) has a peak width at half height of greater than about 0.2°, 0.3°, 0.4°, 0.5°, 0.6°, 0.7°, 0.8°, 0.9°, 1°, 1.1°, 1.2°, 1.3°, 1.4°, 1.5°, 1.6°, 1.7°, 1.8°, 1.9°, 2°, 2.1°, 2.2°, 2.3°, 2.4°, 2.5°, 2.6°, 2.7°, 2.8°, 2.9°, 3°, 3.1°, 3.2°, 3.3°, 3.4°, 3.5°, 3.6°, 3.7°, 3.8°, 3.9°, 4°, 4.1°, 4.2°, 4.3°, 4.4°, 4.5°, 4.6°, 4.7°, 4.8°, 4.9°, or 5°.

The method can further include providing the plurality of silicon nanocrystals which, in one instance, includes providing a silicon feed and thereafter milling the silicon feed to yield silicon nanocrystals. The silicon feed preferably has a percent crystallinity greater than about 60%, 70%, 80%, 90%, 95%, or 99%. In another instance, the silicon feed and the silicon nanocrystals have about the same percent crystallinity. As used herein, the silicon feed and the silicon nanocrystals have about the same percent crystallinity if the individual percentages are within less than about 5% of each other (e.g., 95% and 90% are within 5% of each other), preferably, the percentages are within less than about 4%, 3%, 2% or 1% of each other.

Preferably, the silicon feed is milled in a comminution unit adapted to triturate solids to about the average particle diameter. That is, the silicon feed is milled to reduce the average diameter (particle size) of the material to a predetermined average particle diameter. Notably, the predetermination of the average particle diameter is mill dependent and can include the size of the milling media and/or the size of screens within a milling volume. In another instance, the silicon feed is milled to the silicon nanocrystals the amorphization unit, e.g., wherein the comminution unit is the amorphization unit.

In still another instance, a milling media size is changed to facilitate the amorphization of the silicon nanocrystals. In one example, the milling media size is increased to facilitate the amorphization of the silicon nanocrystals. In another example, the milling media size in the comminution unit is different that the milling media size in the amorphization unit. For example, the milling media size in the comminution unit can be smaller that the milling media size in the amorphization unit. Standard milling media sizes include 0.08-0.12 mm, 0.28-0.35 mm, 0.4-0.6 mm, 0.6-0.8 mm, 0.8-1.0 mm, 1.0-1.2 mm beads.

In yet another instance, the silicon feed is milled in a solvent (e.g., a feed solvent). The feed solvent can include alkanes, alcohols, aromatics, or mixtures thereof. Alkanes can be selected from butane, pentane, hexane, heptane, octane, nonane, decane, and mixtures thereof. Alcohols can be selected from methanol, ethanol, propanol, butanol, pentanol, hexanol, heptanol, octanol, nonanol, decanol, isomers thereof, and mixtures thereof. Aromatics can be selected from benzene, toluene, xylene, mesitylene, phenol, benxyl aochol, and mixtures thereof. The feed solvent can further include or can consists of acetone, methyl ethylketone, THF, DMF, DMSO, acetonitrile, benzonitrile, and mixtures thereof.

Preferably, processing the plurality of silicon nanocrystals with the amorphization unit includes processing an admixture of the plurality of silicon nanocrystals and a solvent (e.g., an amorphization solvent) with the amorphization unit. Herewith, the amorphization solvent can be the same or different from the feed solvent.

In another instance, the admixture of the silicon nanocrystals in the feed solvent has a first viscosity and wherein the first viscosity is reduced prior to or contemporaneously with processing the admixture in the amorphization unit, e.g., reduced to a second viscosity. In one example, the admixture of the silicon nanocrystals in the feed solvent is diluted with additional feed solvent, thereby reducing the first viscosity to the second viscosity. Notably, in this instance, the feed solvent and the amorphization solvent are the same. In another instance, a second solvent is admixed with the silicon nanocrystals and the feed solvent thereby providing a reduced viscosity, the second viscosity. In this instance, the amorphization solvent is an admixture of the feed solvent and a second solvent. In another instance, the first viscosity is reduced by affecting the temperature of the admixture, commonly increasing the temperature thereby reducing the viscosity.

In a different instance, the admixture of the silicon nanocrystals in the feed solvent has a first viscosity and wherein the first viscosity is increased prior to or contemporaneously with processing the admixture in the amorphization unit, e.g., increased to a second viscosity. In one example, the admixture of the silicon nanocrystals in the feed solvent is concentrated, e.g., a portion of the feed solvent is removed, thereby increasing the first viscosity. In another instance, a second solvent is admixed with the silicon nanocrystals and the feed solvent thereby increasing the first viscosity to the second viscosity. In this instance, the amorphization solvent is an admixture of the feed solvent and a second solvent. In another instance, a thickening agent is admixed with the silicon nanocrystals and the feed solvent thereby increasing the first viscosity to the second viscosity. In this instance, the thickening agent can be a polymer or oligomer, e.g., a polymer of oligomer having a molecular weight greater than about 500 Dalton. For example, the amorphization solvent can be an admixture of the feed solvent and the thickening agent. In still another instance, the first viscosity is increased by affecting the temperature of the admixture, commonly decreasing the temperature thereby increasing the viscosity.

In yet another instance, the admixture of the silicon nanocrystals in the amorphization solvent further includes an amorphization reagent. The amorphization reagent can include boron, tin, carbon, germanium, aluminum, phosphorous, sulfur, selenium, of an admixture thereof. Preferably, the amorphization reagent includes an alkali metal salt. The alkali metal salt can be a lithium salt and/or a sodium salt, preferably a lithium salt. Furthermore, the alkali metal salt can include a hydride, borate, aluminate, carbonate, silicate, amide, nitride, nitrate, nitrite, cyanide, cyanate, thiocyanate, phosphate, phosphite, arsenate, arsenite, oxide, peroxide, hydroxide, sulfide, sulfate, thiosulfate, sulfite, acetate, formate, oxalate, chromate, dichromate, manganate, permanganate, ferrate, ferrite, fluoride, chloride, perchlorate, bromide, iodide, perchlorate, iodate, chlorate, bromate, chlorite, hypochlorite, hypobromite, or a mixture thereof. In one example, the admixture of the silicon nanocrystals ("silicon"), the amorphization solvent, and the amorphization reagent ("reagent") includes a reagent:silicon mass ratio of about 1:1000 to about 1:2, about 1:500 to about 1:2, about 1:250 to about 1:2, about 1:200 to about 1:2, about 1:150 to about 1:2, about 1:100 to about 1:2, about 1:50 to about 1:2, about 1:40 to about 1:2, about 1:30 to about 1:2, or about 1:25 to about 1:2. Preferably, the reagent:silicon mass ratio is less than 1:2, 1:3, 1:4, 1:5, 1:6, 1:7, 1:8, 1:9, or 1:10; notably, 1:10 is less than 1:2.

A second embodiment is a process that includes providing an admixture of a silicon feed and a fluid; processing the admixture, in a comminution mill, to form a milled admixture that includes a plurality of silicon nanocrystals in the fluid and thereafter continuing to process, in the comminution mill, to form an amorphous admixture that includes a plurality of amorphous silicon nanoparticles in the fluid. Preferably, the silicon feed has a percent crystallinity greater than about 70%, 75%, 80%, 85%, 90%, 95%, or 98.5% and the resulting silicon nanocrystals have a percent crystallinity greater than about 70%, 75%, 80%, 85%, 90%, or 95%. Thereafter, the amorphous silicon nanoparticles, preferably, have a percent crystallinity less than about 50%, 40%, 30%, 25%, 20%, 15%, or 10%. That is, within the comminution milling, a first step is reducing the size of the silicon material to nanocrystals and a second step is amorphizing the silicon material (the nanocrystals) without affecting their size. In one example, the silicon nanocrystals and the amorphous silicon nanoparticles, each has an average particle diameter that is about 50 nm to about 800 nm, about 50 nm to about 500 nm, about 50 to about 400 nm, about 50 nm to about 300 nm, about 50 nm to about 250 nm, about 50 nm to about 200 nm, about 100 nm to about 350 nm, about 100 nm to about 300 nm, about 150 nm to about 500 nm, about 150 nm to about 400 nm, about 150 nm to about 300 nm, or about 200 nm to about 300 nm. In another example, the silicon nanocrystals and the amorphous silicon nanoparticles, each has an average particle diameter that is within about 200 nm, 150 nm, 100 nm, or 50 nm of the other.

Processing in the comminution mill can include recirculating the admixture through a milling volume. In one example, the comminution mill is a recirculating bead mill. Examples of comminution mills include a Buhler Cenomic, a Buhler Macromedia, and a Netzsch KappaVita. In one example, the silicon feed is milled to a plurality of silicon nanocrystals with a total energy input between about 1,000 to about 15,000 kWhr/ton, about 1,500 to about 12,500 kWhr/ton, about 2,000 to about 10,000 kWhr/ton, or about 2,500 to about 7,500 kWhr/ton; whereas the silicon nanocrystal are converted to amorphous silicon nanoparticles at a total energy input between 2,000-20,000 kWhr/ton, about 3,000 to about 17,500 kWhr/ton, about 4,000 to about 15,000 kWhr/ton, or about 5,000 to about 12,500 kWhr/ton. In another example, the comminution mill is a bead mill adapted for operation in a one-pass mode. Preferably, a one-pass mode includes an extended residence time of the silicon material (feed and nanocrystals) in a milling volume. In one instance, the extended residence time can be affected by slowing a feed rate through the milling volume. In another instance, the extended residence time can be affected by utilizing a mill with an extended milling volume.

A third embodiment is a process that includes providing an admixture of a silicon feed and a first fluid; and then processing the admixture, in a comminution mill, to form a milled admixture that includes a plurality of silicon nanocrystals in the first fluid. Thereafter, the process includes amorphizing the silicon nanocrystals to form an amorphized admixture that includes a plurality of amorphous silicon nanoparticles in a second fluid. In one instance, the first fluid and the second fluid have the same composition and the same quantity (i.e. the concentration of silicon in the admixture and in the amorphized admixture is the same). In an alternative instance, the first fluid and the second fluid are distinguishable based on the quantity of the fluid (i.e. the concentration of silicon in the first fluid (e.g. in the admixture) and the second fluid (e.g., in the amorphized admixture) are different) and/or the composition of the fluid. In one example, the second fluid is an admixture of the first fluid and a third fluid. In another example, the second fluid has a composition that is free of the first fluid, e.g., wherein the first fluid is replace entirely with a third fluid. In one example, the first fluid is removed and replace with the second fluid prior to the amorphization. In another example, the first fluid is admixed with the third fluid prior to or concurrent with amorphization to provide the second fluid.

In another instance, processing the admixture includes milling the admixture in a milling volume utilizing a first milling media while amorphizing the silicon nanocrystals includes milling the silicon nanocrystals in a milling volume utilizing a second milling media. While the composition of the milling media may be the same, the diameter of the first milling media is, preferably, smaller than the diameter of the second milling media. More preferably, the diameter of the first milling media can be greater than 10% smaller than the diameter of the second milling media.

In still another instance, the viscosity of the milled admixture is lowered prior to amorphizing the silicon nanocrystals. Lowering the viscosity can include adding a third fluid to the milled admixture (e.g., admixing the first solvent and the third solvent to provide the second solvent) and/or increasing a temperature of the milled admixture. Typically, viscosity of solutions decrease with increasing temperature. In an alternative instance, the viscosity of the milled admixture is increased prior to amorphizing the silicon nanocrystals. Increasing the viscosity can include removing a portion of the first fluid and/or decreasing a temperature of the milled admixture. Notably, fracture versus amorphization dynamics in the amorphization unit can be influenced by the viscosity of the material within the commutation/amorphization unit. Typically, higher viscosities lower the speed of the milling media thereby changing the force applied to the material being milled.

While the compositions and methods of this invention have been described in terms of preferred embodiments, it will be apparent to those of skill in the art that variations may be applied to the compositions and/or methods in the steps or in the sequence of steps of the method described herein without departing from the concept, spirit and scope of the invention. More specifically, it will be apparent that certain agents that are both chemically and physically related may be substituted for the agents described herein while the same or similar results would be achieved. All such similar substitutes and modifications apparent to those skilled in the art are deemed to be within the spirit, scope and concept of the invention as defined by the appended claims.

What is claimed:

1. A process comprising:
providing a plurality of silicon nanocrystals having an average particle diameter to an amorphization unit adapted to triturate solids to about the average particle diameter, and where the silicon nanocrystals have a percent crystallinity that is greater than about 60%; thereafter
processing the plurality of silicon nanocrystals with the amorphization unit thereby forming a plurality of amorphous silicon nanoparticles, where the amorphous silicon nanoparticles have about the same average particle diameter as the silicon nanocrystals, and where the amorphous silicon nanoparticles have a percent crystallinity that is less than about 50%.

2. The process of claim 1, wherein providing the plurality of silicon nanocrystals includes providing a silicon feed having a percent crystallinity greater than about 60%; and
milling the silicon feed thereby forming the plurality of silicon nanocrystals.

3. The process of claim 2, wherein the silicon feed is milled in a comminution unit adapted to triturate solids to about the average particle diameter.

4. The process of claim 2, wherein the silicon feed is milled in the amorphization unit.

5. The process of claim 2, wherein the silicon feed is milled in a feed solvent, thereby forming an admixture of the silicon nanocrystals in the feed solvent.

6. The process of claim 5, wherein the admixture of the silicon nanocrystals in the feed solvent has a first viscosity and wherein the first viscosity is reduced prior to or contemporaneously with processing the admixture in the amorphization unit.

7. The process of claim 1, wherein processing the plurality of silicon nanocrystals with the amorphization unit includes processing an admixture of the plurality of silicon nanocrystals and a solvent with the amorphization unit.

8. The process of claim 7, wherein the admixture further includes an amorphization reagent.

9. The process of claim 8, wherein the amorphization reagent consists of boron, tin, carbon, germanium, aluminum, phosphorous, sulfur, selenium, of an admixture thereof.

10. The process of claim 8, wherein the amorphization reagent consists of an alkali metal salt.

11. The process of claim 10, wherein the alkali metal salt is a lithium salt and/or a sodium salt.

12. The process of claim 10, wherein the alkali metal salt consists of a hydride, borate, aluminate, carbonate, silicate, amide, nitride, nitrate, nitrite, cyanide, cyanate, thiocyanate, phosphate, phosphite, arsenate, arsenite, oxide, peroxide, hydroxide, sulfide, sulfate, thiosulfate, sulfite, acetate, formate, oxalate, chromate, dichromate, manganate, permanganate, ferrate, ferrite, fluoride, chloride, perchlorate, bromide, iodide, perchlorate, iodate, chlorate, bromate, chlorite, hypochlorite, hypobromite, or a mixture thereof.

13. The method of claim 1, wherein the plurality of silicon nanocrystals is provided in an admixture comprising a fluid, and
wherein the step of processing the plurality of silicon nanocrystals with the amorphization unit thereby forming a plurality of amorphous silicon nanoparticles comprises:
processing the admixture, in a comminution mill, to form a milled admixture that includes the plurality of silicon nanocrystals in the fluid and thereafter continuing to process, in the comminution mill, to form an amorphous admixture that includes the plurality of amorphous silicon nanoparticles in the fluid;
wherein the silicon nanocrystals have a percent crystallinity greater than about 70%; and
wherein the silicon nanocrystals and the amorphous silicon nanoparticles, each has an average particle diameter that is about 50 nm to about 800 nm.

14. The process of claim 13, wherein processing in the comminution mill includes recirculating the admixture through a milling volume.

15. The process of claim 13, wherein the comminution mill is a bead mill adapted for an extended residency of the silicon feed and thereafter the silicon nanocrystals, and wherein the comminution mill is operated in a one-pass mode.

16. The method of claim 1, wherein the plurality of silicon nanocrystals is provided in an admixture comprising a first fluid, and
wherein the step of processing the plurality of silicon nanocrystals with the amorphization unit thereby forming a plurality of amorphous silicon nanoparticles comprises:
processing the admixture, in a comminution mill, to form a milled admixture that includes the plurality of silicon nanocrystals in the first fluid; thereafter
amorphizing the silicon nanocrystals to form the amorphized admixture that includes the plurality of amorphous silicon nanoparticles in a second fluid.

17. The process of claim 16, wherein processing the admixture includes milling the admixture in a milling volume utilizing a first milling media;
wherein amorphizing the silicon nanocrystals includes milling the silicon nanocrystals in a milling volume utilizing a second milling media;
wherein the diameter of the first milling media is smaller than the diameter of the second milling media.

18. The process of claim 16 further comprising lowering a viscosity of the milled admixture prior to amorphizing the silicon nanocrystals;
wherein lowering the viscosity of the milled admixture includes adding a third fluid to the milled admixture and/or increasing a temperature of the milled admixture.

19. The process of claim 16 further comprising increasing a viscosity of the milled admixture prior to amorphizing the silicon nanocrystals;
wherein increasing the viscosity of the milled admixture includes removing a portion of the first fluid and/or decreasing a temperature of the milled admixture.

* * * * *